(12) United States Patent
Harper

(10) Patent No.: US 7,916,071 B2
(45) Date of Patent: Mar. 29, 2011

(54) SYSTEM AND METHOD FOR DETERMINING A REFERENCE LOCATION OF A MOBILE DEVICE

(75) Inventor: Neil Harper, Mangerton (AU)

(73) Assignee: Andrew, LLC, Hickory, NC (US)

( * ) Notice: Subject to any disclaimer, the term of this patent is extended or adjusted under 35 U.S.C. 154(b) by 164 days.

(21) Appl. No.: 12/389,734

(22) Filed: Feb. 20, 2009

(65) Prior Publication Data

US 2010/0156713 A1      Jun. 24, 2010

Related U.S. Application Data

(60) Provisional application No. 61/140,465, filed on Dec. 23, 2008.

(51) Int. Cl.
*G01S 19/48* (2010.01)

(52) U.S. Cl. .................................. 342/357.31

(58) Field of Classification Search ............. 342/357.09, 342/357.31
See application file for complete search history.

(56) References Cited

U.S. PATENT DOCUMENTS

| | | |
|---|---|---|
| 3,150,372 A | 9/1964 | Groth, Jr. |
| 3,659,085 A | 4/1972 | Potter et al. |
| 4,728,959 A | 3/1988 | Maloney |
| 4,814,751 A | 3/1989 | Hawkins |
| 4,845,504 A | 7/1989 | Roberts et al. |
| 4,891,650 A | 1/1990 | Sheffer |
| 5,056,106 A | 10/1991 | Wang |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |

(Continued)

FOREIGN PATENT DOCUMENTS

JP      06-347529      12/1994

(Continued)

OTHER PUBLICATIONS

Amir Leshem, Mati Wax, "Array Calibration in the Presence of Multipath," IEEE Transactions on Signal Processing, vol. 48, No. 1, pp. 53-59, Jan. 2000.

(Continued)

*Primary Examiner* — Thomas H Tarcza
*Assistant Examiner* — Harry Liu
(74) *Attorney, Agent, or Firm* — Duane Morris, LLP

(57) ABSTRACT

A system and method for determining a reference location of a wireless device wherein a location request may be received for the wireless device where the location request fails to identify an approximate location for the wireless device. A reference location may be determined for the wireless device, the reference location selected from the group consisting of: an area defined as a function of at least one of a mobile country code, mobile network code, and/or a location area code; an area defined by a mapping of a provided Internet protocol address to a location; an area determined as a function of a position information element in the location request; a default area; and combinations thereof.

21 Claims, 6 Drawing Sheets

U.S. PATENT DOCUMENTS

| | | | |
|---|---|---|---|
| 5,515,419 | A | 5/1996 | Sheffer |
| 5,519,760 | A | 5/1996 | Borkowski et al. |
| 5,559,864 | A | 9/1996 | Kennedy |
| 5,592,180 | A | 1/1997 | Yokev et al. |
| 5,608,410 | A | 3/1997 | Stilp et al. |
| 5,614,914 | A | 3/1997 | Bolgiano et al. |
| 5,675,344 | A | 10/1997 | Tong et al. |
| 5,736,964 | A | 4/1998 | Ghosh et al. |
| 5,815,538 | A | 9/1998 | Grell et al. |
| 5,825,887 | A | 10/1998 | Lennen |
| 5,870,029 | A | 2/1999 | Otto et al. |
| 5,920,278 | A | 7/1999 | Tyler et al. |
| 5,952,969 | A | 9/1999 | Hagerman et al. |
| 5,959,580 | A | 9/1999 | Maloney et al. |
| 5,960,341 | A | 9/1999 | LeBlanc et al. |
| 5,973,643 | A | 10/1999 | Hawkes et al. |
| 5,987,329 | A | 11/1999 | Yost |
| 6,014,102 | A | 1/2000 | Mitzlaff et al. |
| 6,047,192 | A | 4/2000 | Maloney |
| 6,091,362 | A | 7/2000 | Stilp |
| 6,097,336 | A | 8/2000 | Stilp |
| 6,097,959 | A | 8/2000 | Yost |
| 6,101,178 | A | 8/2000 | Beal |
| 6,108,555 | A | 8/2000 | Maloney et al. |
| 6,115,599 | A | 9/2000 | Stilp |
| 6,119,013 | A | 9/2000 | Maloney et al. |
| 6,127,975 | A | 10/2000 | Maloney |
| 6,144,711 | A | 11/2000 | Raleigh et al. |
| 6,172,644 | B1 | 1/2001 | Stilp |
| 6,184,829 | B1 | 2/2001 | Stilp |
| 6,188,351 | B1 | 2/2001 | Bloebaum |
| 6,191,738 | B1 | 2/2001 | Pfeil et al. |
| 6,201,499 | B1 | 3/2001 | Hawkes et al. |
| 6,201,803 | B1 | 3/2001 | Munday et al. |
| 6,212,319 | B1 | 4/2001 | Cayrefourcq |
| 6,233,459 | B1 | 5/2001 | Sullivan et al. |
| 6,246,884 | B1 | 6/2001 | Karmi et al. |
| 6,266,013 | B1 | 7/2001 | Stilp et al. |
| 6,281,834 | B1 | 8/2001 | Stilp |
| 6,285,321 | B1 | 9/2001 | Stilp et al. |
| 6,288,675 | B1 | 9/2001 | Maloney |
| 6,288,676 | B1 | 9/2001 | Maloney |
| 6,295,455 | B1 | 9/2001 | Fischer et al. |
| 6,311,043 | B1 | 10/2001 | Haardt et al. |
| 6,317,081 | B1 | 11/2001 | Stilp |
| 6,317,604 | B1 | 11/2001 | Kovach, Jr. et al. |
| 6,334,059 | B1 | 12/2001 | Stilp et al. |
| 6,351,235 | B1 | 2/2002 | Stilp |
| 6,366,241 | B2 | 4/2002 | Pack |
| 6,388,618 | B1 | 5/2002 | Stilp et al. |
| 6,400,320 | B1 | 6/2002 | Stilp et al. |
| 6,407,703 | B1 | 6/2002 | Minter et al. |
| 6,463,290 | B1 | 10/2002 | Stilp et al. |
| 6,470,195 | B1 | 10/2002 | Meyer |
| 6,477,161 | B1 | 11/2002 | Hudson |
| 6,483,460 | B2 | 11/2002 | Stilp et al. |
| 6,492,944 | B1 | 12/2002 | Stilp |
| 6,501,955 | B1 | 12/2002 | Durrant et al. |
| 6,519,465 | B2 | 2/2003 | Stilp et al. |
| 6,546,256 | B1 | 4/2003 | Maloney |
| 6,553,322 | B1 | 4/2003 | Ignagni |
| 6,563,460 | B2 | 5/2003 | Stilp et al. |
| 6,571,082 | B1 | 5/2003 | Rahman |
| 6,603,428 | B2 | 8/2003 | Stilp |
| 6,603,761 | B1 | 8/2003 | Wang |
| 6,640,106 | B2 | 10/2003 | Gutowski et al. |
| 6,646,604 | B2 | 11/2003 | Anderson |
| 6,661,379 | B2 | 12/2003 | Stilp et al. |
| 6,765,531 | B2 | 7/2004 | Anderson |
| 6,771,625 | B1 | 8/2004 | Beal |
| 6,771,969 | B1 | 8/2004 | Chinoy |
| 6,782,264 | B2 | 8/2004 | Anderson |
| 6,834,234 | B2 | 12/2004 | Scherzinger et al. |
| 6,839,539 | B2 | 1/2005 | Durrant et al. |
| 6,845,240 | B2 | 1/2005 | Carlson et al. |
| 6,859,172 | B2 | 2/2005 | Powers et al. |
| 6,871,077 | B2 | 3/2005 | Kennedy, Jr. |
| 6,873,290 | B2 | 3/2005 | Anderson et al. |
| 6,876,859 | B2 | 4/2005 | Anderson et al. |
| 6,920,329 | B2 | 7/2005 | Kennedy, Jr. et al. |
| 6,922,170 | B2 | 7/2005 | Alexander, Jr. |
| 6,952,158 | B2 | 10/2005 | Kennedy, Jr. |
| 6,987,979 | B2 | 1/2006 | Carlsson |
| 6,996,392 | B2 | 2/2006 | Anderson |
| 7,023,383 | B2 | 4/2006 | Stilp et al. |
| 7,167,713 | B2 | 1/2007 | Anderson |
| 7,271,765 | B2 | 9/2007 | Stilp et al. |
| 7,340,259 | B2 | 3/2008 | Maloney |
| 7,427,952 | B2 | 9/2008 | Bull et al. |
| 7,440,762 | B2 | 10/2008 | Maloney et al. |
| 7,593,738 | B2 | 9/2009 | Anderson |
| 2002/0172223 | A1 | 11/2002 | Stilp et al. |
| 2003/0064734 | A1 | 4/2003 | Stilp et al. |
| 2003/0139188 | A1 | 7/2003 | Chen et al. |
| 2003/0190919 | A1 | 10/2003 | Niemenmaa |
| 2003/0203738 | A1 | 10/2003 | Brown et al. |
| 2004/0043775 | A1 | 3/2004 | Kennedy, Jr. et al. |
| 2004/0132466 | A1 | 7/2004 | Kennedy, Jr. et al. |
| 2004/0203921 | A1 | 10/2004 | Bromhead et al. |
| 2004/0218664 | A1 | 11/2004 | Kennedy, Jr. et al. |
| 2004/0252752 | A1 | 12/2004 | Kennedy, Jr. et al. |
| 2005/0058182 | A1 | 3/2005 | Kennedy, Jr. et al. |
| 2005/0136945 | A1 | 6/2005 | Kennedy, Jr. et al. |
| 2005/0164712 | A1 | 7/2005 | Kennedy, Jr. et al. |
| 2005/0192026 | A1 | 9/2005 | Carlson et al. |
| 2006/0003695 | A1 | 1/2006 | Kennedy, Jr. et al. |
| 2006/0003775 | A1 | 1/2006 | Bull et al. |
| 2006/0030333 | A1 | 2/2006 | Ward et al. |
| 2006/0116130 | A1 | 6/2006 | Kennedy, Jr. et al. |
| 2006/0125695 | A1 | 6/2006 | Kennedy, Jr. et al. |
| 2006/0141998 | A1 | 6/2006 | Kennedy, Jr. et al. |
| 2006/0154607 | A1 | 7/2006 | Kennedy, Jr. et al. |
| 2006/0240836 | A1 | 10/2006 | Kennedy, Jr. et al. |
| 2007/0087689 | A1 | 4/2007 | Kennedy, Jr. et al. |
| 2007/0096981 | A1* | 5/2007 | Abraham ................ 342/357.15 |
| 2007/0111746 | A1 | 5/2007 | Anderson et al. |
| 2007/0155401 | A1 | 7/2007 | Ward et al. |
| 2007/0155489 | A1 | 7/2007 | Beckley et al. |
| 2007/0182547 | A1 | 8/2007 | Wachter et al. |
| 2007/0202885 | A1 | 8/2007 | Kennedy, Jr. et al. |
| 2007/0281670 | A1 | 12/2007 | Shim |
| 2008/0132244 | A1 | 6/2008 | Anderson et al. |
| 2008/0132247 | A1 | 6/2008 | Anderson et al. |
| 2008/0137524 | A1 | 6/2008 | Anderson et al. |
| 2008/0158059 | A1 | 7/2008 | Bull et al. |
| 2008/0160952 | A1 | 7/2008 | Bull et al. |
| 2008/0160953 | A1 | 7/2008 | Mia et al. |
| 2008/0161015 | A1 | 7/2008 | Maloney et al. |
| 2008/0248811 | A1 | 10/2008 | Maloney et al. |
| 2008/0261611 | A1 | 10/2008 | Mia et al. |
| 2008/0261612 | A1 | 10/2008 | Mia et al. |
| 2008/0261613 | A1 | 10/2008 | Anderson et al. |
| 2008/0261614 | A1 | 10/2008 | Mia et al. |
| 2009/0005061 | A1 | 1/2009 | Ward et al. |
| 2009/0124267 | A1* | 5/2009 | del Castillo ................ 455/456.6 |

FOREIGN PATENT DOCUMENTS

| | | |
|---|---|---|
| KR | 100668396 B1 | 1/2007 |
| WO | 02/05585 A1 | 1/2002 |
| WO | 06088472 A1 | 8/2006 |

OTHER PUBLICATIONS

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj, "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Netowrks," IEEE Transactions on Vehicular Technology; vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

Y. Zhao, "Standardization of Mobile Phone Positioning for 3G Systems," IEEE Communications Magazine, Jul. 2002, pp. 108-116.

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman;"A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

* cited by examiner

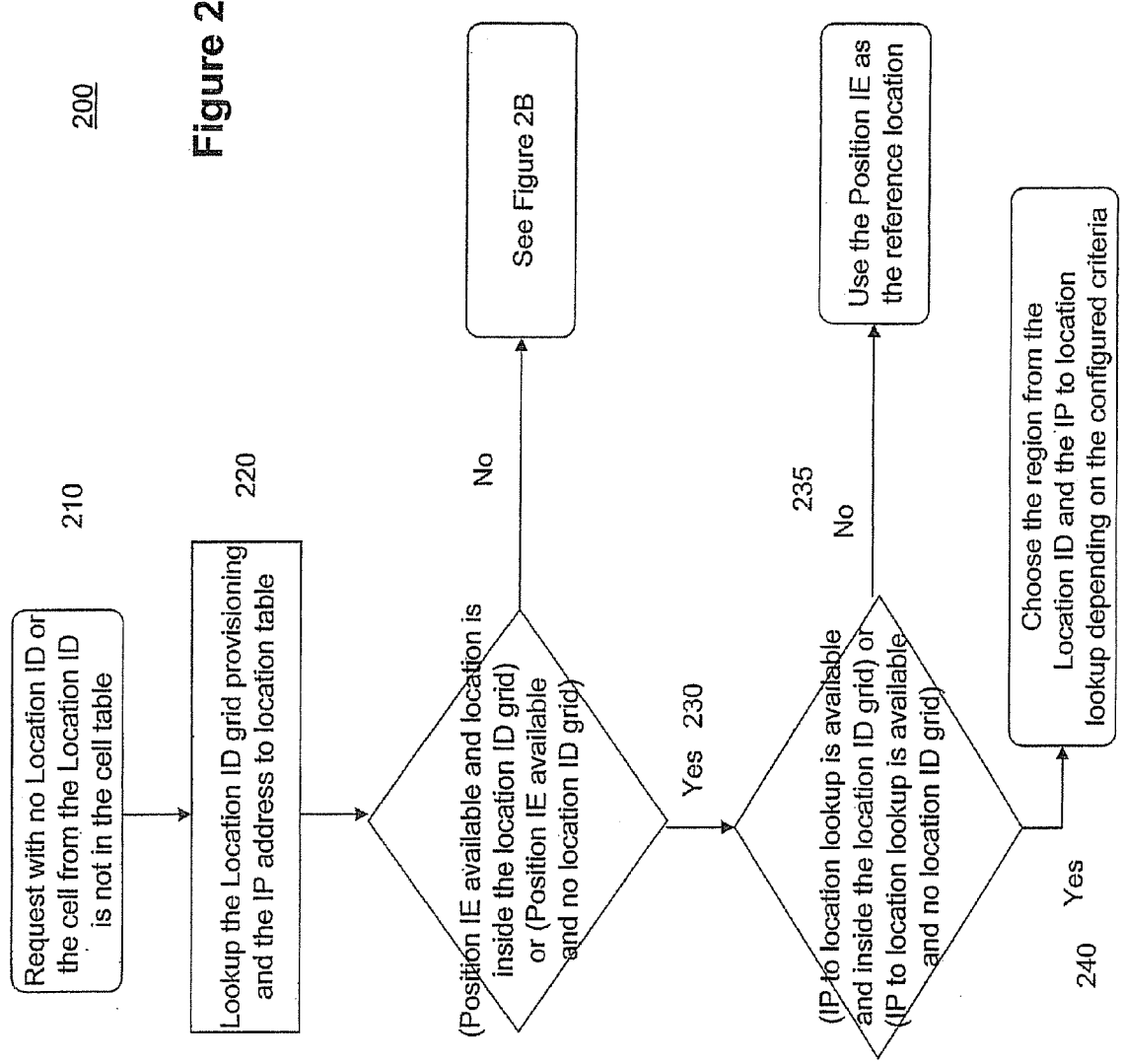

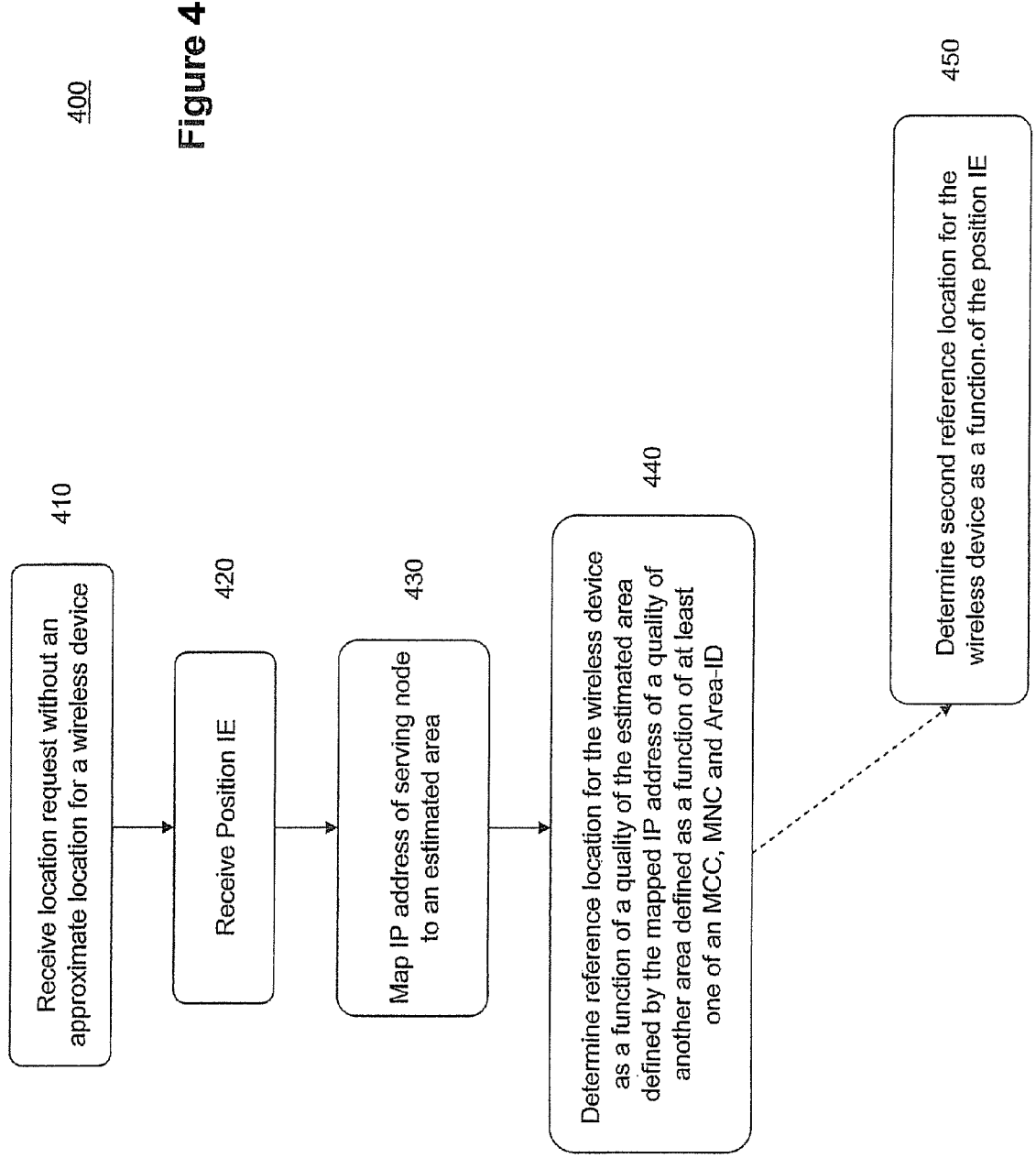

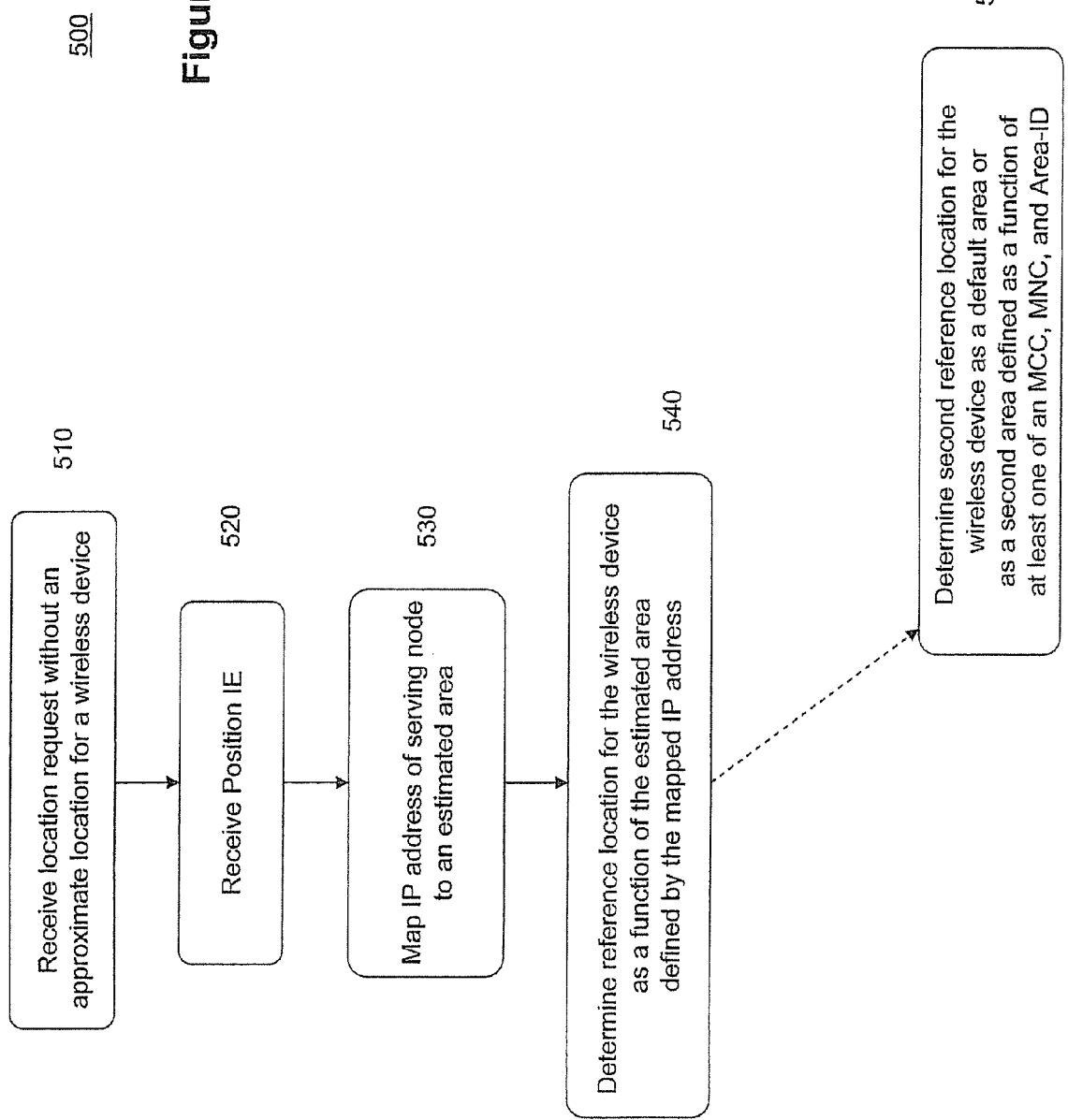

SYSTEM AND METHOD FOR DETERMINING A REFERENCE LOCATION OF A MOBILE DEVICE

RELATED APPLICATIONS

The instant application claims the priority benefit of U.S. Provisional Application No. 61/140,465, filed Dec. 23, 2008, the entirety of which is incorporated herein by reference. The instant application is related to U.S. application Ser. No. 12/437,969, filed May 8, 2009, entitled "System and Method for Determining a Reference Area for A-GPS in a Network Using Cell Table Data Mining," the entirety of which is incorporated herein by reference.

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, in 2001 the United States Federal Communications Commission ("FCC") required that cellular handsets must be geographically locatable. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an elevation of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are conventionally utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time. There is also an L2C signal being transmitted by several satellites. The LC2C signal is a second civilian frequency transmitted by GPS satellites. L1 transmits the Coarse Acquisition ("C/A") code. L2C transmits L2CM (civil-moderate) and L2CL (civil long) codes. These codes allow a device to differentiate between satellites that are all transmitting on the same frequency. The C/A code is 1 milliseconds long, the L2CM is 20 milliseconds long and the L2CL is 1.5 seconds long. The L2C codes provide a more robust cross-correlation performance so that reception of weak GPS signals is less affected by simultaneously received strong GPS signals. The civil navigation message ("CNAV") is the broadcast model that can be transmitted on the L2C and provides a more accurate and frequent message than the legacy navigation message ("NAV").

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors, and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems generally account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time, is the instantaneous bias between the receiver clock and the satellite clock. It is possible to calculate a location with only three satellites when additional information is available. For example, if the altitude of the handset or mobile device is well known, then an arbitrary satellite measurement may be included that is centered at the center of the earth and possesses a range defined as the distance from the center of the earth to the known altitude of the handset or mobile device. The altitude of the handset may be known from another sensor or from information from the cell location in the case where the handset is in a cellular network.

Traditionally, satellite coordinates and velocity have been computed inside the GPS receiver. The receiver obtains satellite ephemeris and clock correction data by demodulating the satellite broadcast message stream. The satellite transmission contains more than 400 bits of data transmitted at 50 bits per second. The constants contained in the ephemeris data coincide with Kepler orbit constants requiring many mathematical operations to turn the data into position and velocity data for each satellite. In one implementation, this conversion requires 90 multiplies, 58 adds and 21 transcendental function cells (sin, cos, tan) in order to translate the ephemeris into a satellite position and velocity vector at a single point, for one satellite. Most of the computations require double precision, floating point processing.

Thus, the computational load for performing the traditional calculation is significant. The mobile device must include a high-level processor capable of the necessary calculations, and such processors are relatively expensive and consume large amounts of power. Portable devices for consumer use, e.g., a cellular phone or comparable device, are preferably inexpensive and operate at very low power. These design goals are inconsistent with the high computational load required for GPS processing. Further, the slow data rate from the GPS satellites is a limitation. GPS acquisition at a GPS receiver may take many seconds or several minutes, during which time the receiver circuit and processor of the mobile device must be continuously energized. Preferably, to maintain battery life in portable receivers and transceivers such as mobile cellular handsets, circuits are de-energized as much as possible. The long GPS acquisition time can rapidly deplete the battery of a mobile device. In any situation and particularly in emergency situations, the long GPS acquisition time is inconvenient.

Assisted-GPS ("A-GPS") has gained significant popularity recently in light of stringent time to first fix ("TTFF"), i.e., first position determination and sensitivity, requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network or a wide area reference network ("WARN")) including receivers with clear views of the sky that may operate continuously. This reference network may also be connected with the cellular infrastructure, may continuously monitor the real-time constellation status, and may provide data for each satellite at a particular epoch time. For example, the reference network may provide ephemeris information, UTC model information, ionosphere model information, and other broadcast information to the cellular infrastructure. As one skilled in the art would recognize, the GPS reference receiver and its server (or position determining entity) may be located at any surveyed location with an open view of the sky. Typical A-GPS information may include data for determining a GPS receiver's approximate position, time synchronization mark, satellite ephemerides, various model information and satellite dopplers. Different A-GPS services may omit some of these parameters; however, another component of the supplied information is the identification of the satellites for which a device or GPS receiver should search. From such assistance data, a mobile device will attempt to search for and acquire satellite signals for the satellites included in the assistance data. If, however, satellites are included in the assistance data that are not measurable by the mobile device (e.g., the satellite is no longer visible, etc.), then the mobile device will waste time and considerable power attempting to acquire measurements for the satellite.

A-GPS handset implementations generally rely upon provided assistance data to indicate which satellites are visible. As a function of the assistance data, a mobile device will attempt to search for and acquire satellite signals for the satellites included in the assistance data. A-GPS positioning generally relies upon the availability of a coarse location estimate to seed the positioning method. This coarse estimate may be utilized to determine a likely set of satellites from which a respective mobile device may receive signals. In the absence of a location estimate or in scenarios having a location estimate with a large uncertainty, the likely set of measurable satellites may be quite large. Further, each of these satellites may not be measurable (e.g., the satellite is no longer visible, etc.). If satellites are included in the assistance data that are not measurable by the mobile device, then the mobile device will waste time and considerable power attempting to acquire measurements for the satellite. Further, signaling methods often limit the number of satellites for which signals may be provided.

Accordingly, there is a need for a system and method to determine a reference location for a mobile device that would overcome the deficiencies of the prior art. Therefore, an embodiment of the present subject matter provides a method for determining a reference location of a wireless device. The method may comprise receiving a location request for the wireless device, the location request failing to identify an approximate location for the wireless device and receiving a position information element ("IE") from the wireless device. An Internet protocol ("IP") address of a node serving the wireless device may be mapped to an estimated area. If the estimated area defined by the mapped IP address is within a second area defined as a function of at least one of a mobile country code ("MCC"), mobile network code ("MNC"), and an Area-ID. For example, if the respective network is a GSM EDGE Radio Access Network ("GERAN"), the Area-ID would be a location area code ("LAC"). Similarly, if the respective network is a UMTS Terrestrial Radio Access Network ("UTRAN"), the Area-ID would be a Radio Network Controller-Identification ("RNC-ID"). Further, if the estimated area defined by the mapped IP address is available and no second area is defined as a function of at least one of an MCC, MNC, and Area-ID, then a reference location may be determined for the wireless device as a function of a quality of the estimated area defined by the mapped IP address or a quality of the second area defined as a function of at least one of an MCC, MNC, and Area-ID. In another embodiment, the second reference location for the wireless device may be determined as a function of the position IE if the estimated area defined by the mapped IP address is not within the second area defined as a function of at least one of an MCC, MNC, and Area-ID or if the area defined by the mapped IP address is not available and no second area is defined as a function of at least one of an MCC, MNC, and Area-ID.

Another embodiment of the present subject matter provides a method for determining a reference location of a wireless device. The method may comprise receiving a location request for the wireless device, the location request failing to identify an approximate location for the wireless device and receiving a position IE from the wireless device. An IP address of a node serving the wireless device may be mapped to an estimated area. If the estimated area defined by the mapped IP address is within a second area defined as a function of at least one of an MCC, MNC, and Area-ID or if the estimated area defined by the mapped IP address is available and no second area is defined as a function of at least one of an MCC, MNC, and Area-ID, then a reference location may be determined for the wireless device as a function of the estimated area defined by the mapped IP address. In another embodiment, the second reference location for the wireless device may be determined as a default area or as the second area defined as a function of at least one of an MCC, MNC, and Area-ID if the estimated area defined by the mapped IP address is not within the second area defined as a function of at least one of an MCC, MNC, and Area-ID or if the estimated area defined by the mapped IP address is not available and no second area is defined as a function of at least one of an MCC, MNC, and Area-ID.

An additional embodiment of the present subject matter provides a system for determining a reference location of a wireless device. The system may comprise a receiver for receiving a location request for a wireless device, the location request failing to identify an approximate location for the wireless device and having a position IE. The system may also include circuitry for mapping an IP address of a node serving the wireless device to an estimated area and circuitry for determining a reference location for the wireless device, the reference location selected from the group consisting of: an area defined as a function of at least one of an MCC, MNC, and Area-ID; an area defined by the mapped IP address; an area determined as a function of the received position IE; a default area; and combinations thereof. The system may also include a transmitter for transmitting assistance data to the wireless device as a function of the determined reference location.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

FIGS. 2A and 2B are illustrations of exemplary algorithms according to an embodiment of the present subject matter.

FIG. 4 is an illustration of an exemplary algorithm according to an embodiment of the present subject matter.

FIG. 5 is an illustration of an exemplary algorithm according to a further embodiment of the present subject matter.

DETAILED DESCRIPTION

Figure 1:
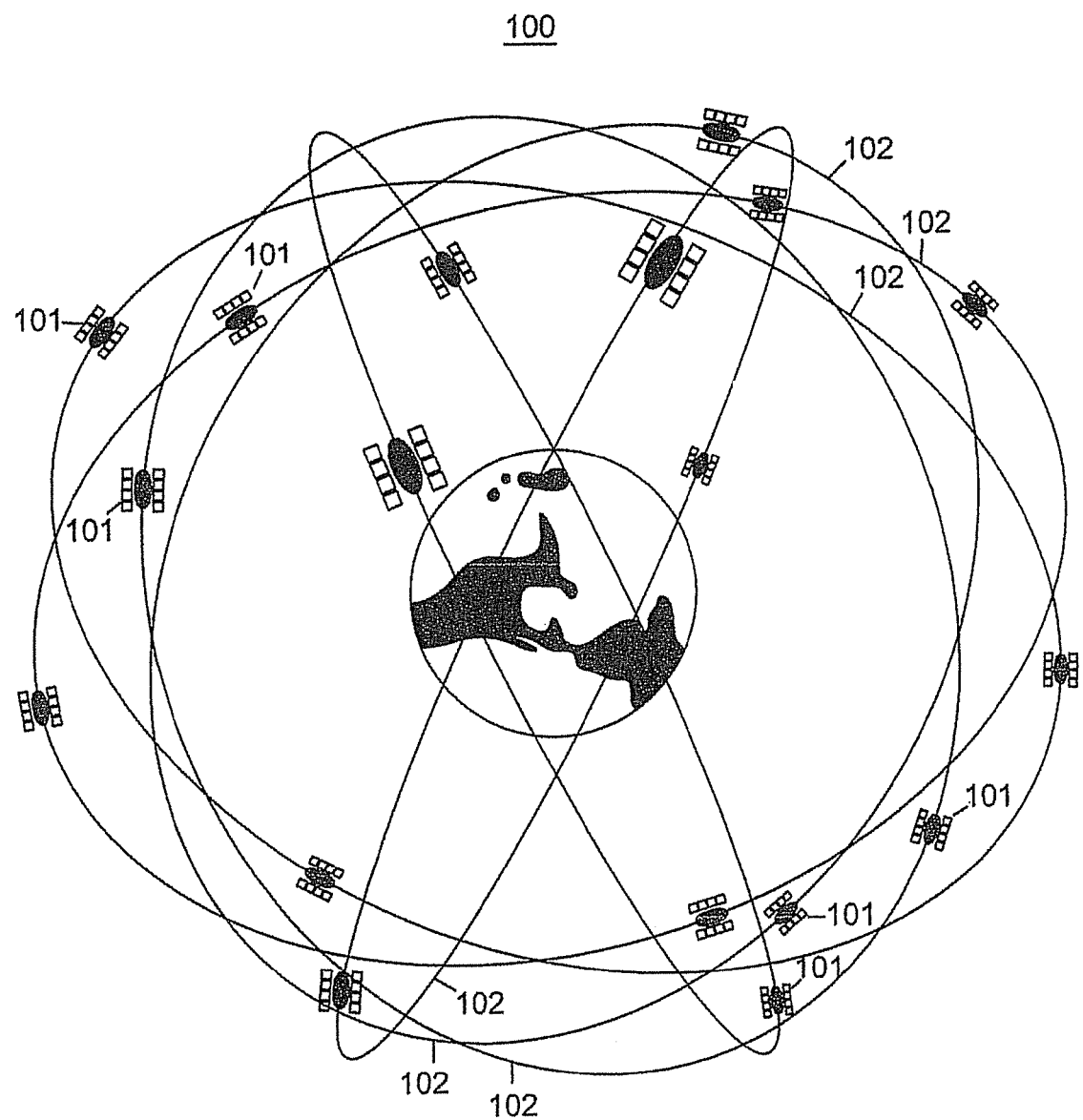
FIG. 1 is a schematic representation of a constellation of GPS satellites.

With reference to the figures where like elements have been given like numerical designations to facilitate an understanding of the present subject matter, the various embodiments of a system and method for determining a reference location for a mobile device are herein described.

The disclosure relates to a mobile appliance or device and a location determining system using satellite signals and/or measurements of these satellite signals. Exemplary devices may include, but are not limited to, a cellular device, text messaging device, computer, portable computer, vehicle locating device, vehicle security device, communication device, and wireless transceiver. The satellites may be considered as part of a Global Navigation Satellite System ("GNSS"), such as, but not limited to, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to GPS, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above.

Generally wireless A-GPS devices or handsets have a low time to first fix ("TTFF") as the devices are supplied with assistance data from an exemplary communications network to assist in locking onto or acquiring satellites quickly. Exemplary A-GPS devices may include, but are not limited to, a cellular device, text messaging device, computer, portable computer, vehicle locating device, vehicle security device, communication device, and wireless transceiver. These devices may provide satellite measurements back to a location determining system to perform a position calculation. Exemplary network elements that supply the assistance data and/or perform the position calculation may be a location determining system such as a Mobile Location Center ("MLC"), location information server or system ("LIS"), or other comparable network element. The location determining system may generally be a node in a wireless network that performs the location of a mobile device.

Typical A-GPS information includes data for determining a GPS receiver's approximate position, time synchronization mark, satellite ephemerides, and satellite dopplers. Different A-GPS services may omit some of these parameters; however, another component of the supplied information is the identification of the satellites for which a device or GPS receiver should search. The MLC generally determines this information utilizing an approximate location of the device. Conventionally, this approximate location may be the location of the cell tower serving the device. The MLC may then supply the device with the appropriate A-GPS assistance data for the set of satellites in view from this conventional location.

This typical process performs well when the approximate location possesses a small uncertainty; however, in the absence of an approximate location or where the approximate location possesses a large uncertainty (e.g., an uncertainty measured in hundreds of kilometers) the possible set of satellites may be quite large, and not all of the satellites in this set may be measurable. As each satellite requires time and resources to provide assistance data therefor and signaling methods often limit the number of satellites for which signals may be provided, assistance data for only a subset of the set satellites may be provided to the mobile device. Since A-GPS implementations generally rely upon the provided assistance data to indicate which satellites are visible, the mobile device attempts to acquire only the satellite signals for the satellites included in the assistance data.

A wireless device such as, but not limited to, a secure user plane ("SUPL")—enabled terminal ("SET") may generally report an identification of a cell in a Location ID information element ("IE"). A respective server may then utilize the Location ID to ascertain a location of the cell in a database. However, there are times when the serving cell is not in the cell database because it has not been provisioned, or the SET has roamed to another network operators' communications system. There are also times when the cell information is not present in the Location ID, for example, when the SET is connected to the network via WiFi. Therefore, an aspect of embodiments of the present subject matter may determine a reference or an approximate location of a mobile device when a reference location is not provided in a respective location request. This determined reference location may then be utilized to determine the satellites that are in view from that area. Exemplary methods and systems to determine satellites that are in view are described in co-pending U.S. application Ser. No. 12/099,694, filed, Apr. 8, 2008, entitled, "System and Method for A-GPS Positioning of a Mobile Device," the entirety of which is incorporated herein by reference.

Several exemplary techniques may be utilized and are herein described to determine an approximate location of a mobile device or SET when a reference location such as, but not limited to, a cell, is not provided in a respective cell table; however, the following description should not limit the scope of the claims appended herewith as it is envisioned that other techniques known to those of ordinary skill in the art may also be employed with embodiments of the present subject matter.

In one embodiment, the approximate location of a mobile device may be determined as a function of Location ID area provisioning. Generally, this embodiment may provide a database table that allows a network operator to define areas associated with a provisioned mobile country code ("MCC"), mobile network code ("MNC"), and/or Area-Identification. For example, if the respective network is a GSM EDGE Radio Access Network ("GERAN"), the Area-ID would be a location area code ("LAC"), and if the respective network is a UMTS Terrestrial Radio Access Network ("UTRAN"), the Area-ID would be a Radio Network Controller-Identification ("RNC-ID"). The network operator may thus provide areas as a function of MCC(s), MCCs and MNCs, and MCCs, MNCs and Area-IDs. These areas may also be provisioned as a bounding polygon by provisioning boundaries thereto. For example, if the provisioned area is a rectangle, the area may be provided with boundaries comprising a northern latitude, southern latitude, eastern longitude and western longitude. Of course, any number or type of polygons may be defined or provisioned having a series of vertices but may also comprise other shapes having non-intersecting vertices such as an ellipse, circle, or shapes defined by one or more irregular boundaries, etc. When a location request is received requiring the calculation of GPS assistance data, then an exemplary location determining system, e.g., MLC or LIS, may search for an area that matches the finest granularity of MCC, MNC and/or Area-ID from the Location ID provided in the request. For example, the MLC may determine whether a correlation exists with an MCC, MNC, and Area-ID. If such a correlation cannot be found, then the MLC may determine if a correlation exists with an MCC and MNC. In the event such a correlation cannot be found, then the MLC may determine if a correlation exists with MCC alone. Such determined areas are likely to include the respective mobile device or SET.

In another embodiment, the approximate location of a mobile device may be determined as a function of a position information element ("IE"). As is well known in the industry, a position IE is a field that a SET may provide to a SUPL location platform ("SLP") or other positioning determining entity ("PDE") in a SUPL_POS_INIT message. Such an approximate location may generally be quite accurate; however, if a respective SET is off and the user travels some distance before powering the SET on without updating the SETs location estimate, then the value in this field may be inaccurate.

A further embodiment may determine a reference or approximate location of a mobile device as a function of an Internet protocol ("IP") address to location lookup. In this embodiment, a database table (or some other interface) may provide a mapping of the respective IP address to a location, with or without an associated uncertainty. The accuracy of this location may be a function of whether the information in the respective database is current and whether the user is near his or her respective home location.

Another embodiment may determine a reference or approximate location of a mobile device as a function of a default area. In this exemplary embodiment, a network operator may provision a default area where a mobile device or SET is most likely located. This default may be used if no other information is provided or is reliable. The default area may also likely cover an area where most of the expected users of the network would be. Of course, any one or combinations of the aforementioned embodiments may be supplied or determined as a reference location as will be further described below.

Figure 2B:
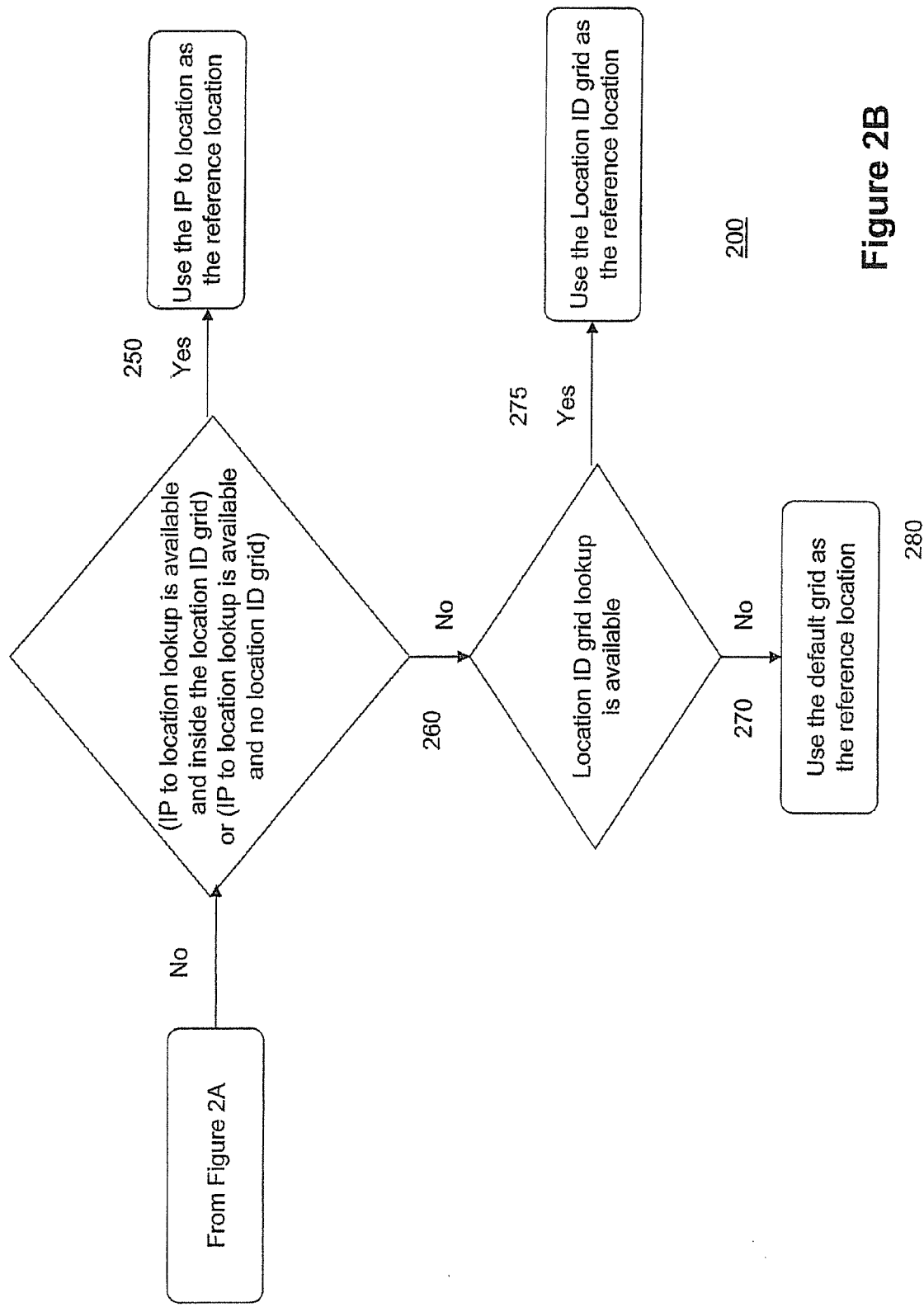

FIGS. 2A and 2B are illustrations of exemplary algorithms according to an embodiment of the present subject matter. With reference to FIGS. 2A and 2B, an exemplary algorithm 200 may determine an initial reference location of a mobile device by determining an area likely to contain the mobile device. This area may be large and may be appropriately utilized to perform a sanity check upon more refined areas, that is, smaller areas that may have less of a probability of containing the respective mobile device, if such areas exist. When a location request is received 210, as much information as possible may be obtained by looking up the location ID area provisioning and the IP to location tables 220. If there is a location ID area record available 230, 235, 240, then this may be used to sanity check the other received information. If any of the other received information are present 230, 235, 240, then the other information may be considered if the information falls inside the provisioned location ID area.

In the event that the position IE and the IP to location area are both inside the location ID area, the resulting location area may be selected by a predetermined set of rules. For example, one method may be selected over another method as a function of the uncertainty or quality of the methods falling within a predetermined area or grid 240. If, however, there is no location ID area, then the best information of the position IE and IP to location area methods may be selected 250. If none of the position IE and/or IP to location area methods provides sufficient or reliable information 260, 270, then a default area may be selected 280. Of course, additional rules or techniques 275 may be utilized to select a location area and such examples should not limit the scope of the claims appended herewith.

By way of further example, a user of a mobile device or SET may power down the SET and travel from the United States to a distant location, such as Tasmania. The SLP may be configured to use the region with the smallest uncertainty when both the position IE and the IP to location area methods satisfy the sanity check. When the SET is powered on, the SET connects to the local cellular network and back to the SLP in the United States. While the serving Tasmanian cell may not be in the respective U.S. database, there may exist an entry in the location ID that provisions for the MCC, MNC, and/or Area-ID provided by the SET in the respective Location ID. In this example, however, since the SET did not supply the position IE, the IP address would not be in the IP address to location lookup and the location ID provisioning may be utilized as the reference location. In the instance that a position IE is provided and still points to the home location in the United States, the IP address would not be in the IP address to location lookup; therefore, the position IE would be outside the Location ID area and the location ID area would be utilized as the reference location. In the instance that a position IE is provided that covers the Tasmanian location entered by the user, the IP address would not be in the IP address to location lookup; however, the position IE would be inside the location ID area and may be used for the reference location. Therefore, in the instance where there is a position IE that covers the Tasmanian location entered by the user, the IP address may be in the IP address to location lookup. This uncertainty is generally smaller than that in the position IE; therefore, both the position IE and the IP to location lookup are inside the location ID area, but the IP to location lookup technique provides a smaller uncertainty and may subsequently be utilized for the reference location.

In yet another example, assuming when the SET is powered on in Tasmania, the SET may connect to a WiFi network and then back to the SLP in the United States. In this example, no cell ID would be reported since the SET is not connected to a cellular network, but, there is a position IE that covers the Tasmanian location entered by the user. While the IP address is in not in the IP address to location lookup, the position IE may be utilized as the reference location. In the instance that the SET does not supply the position IE and the IP address is not in the IP address to location loolup, a default area may then be utilized as the reference location.

Figure 3:
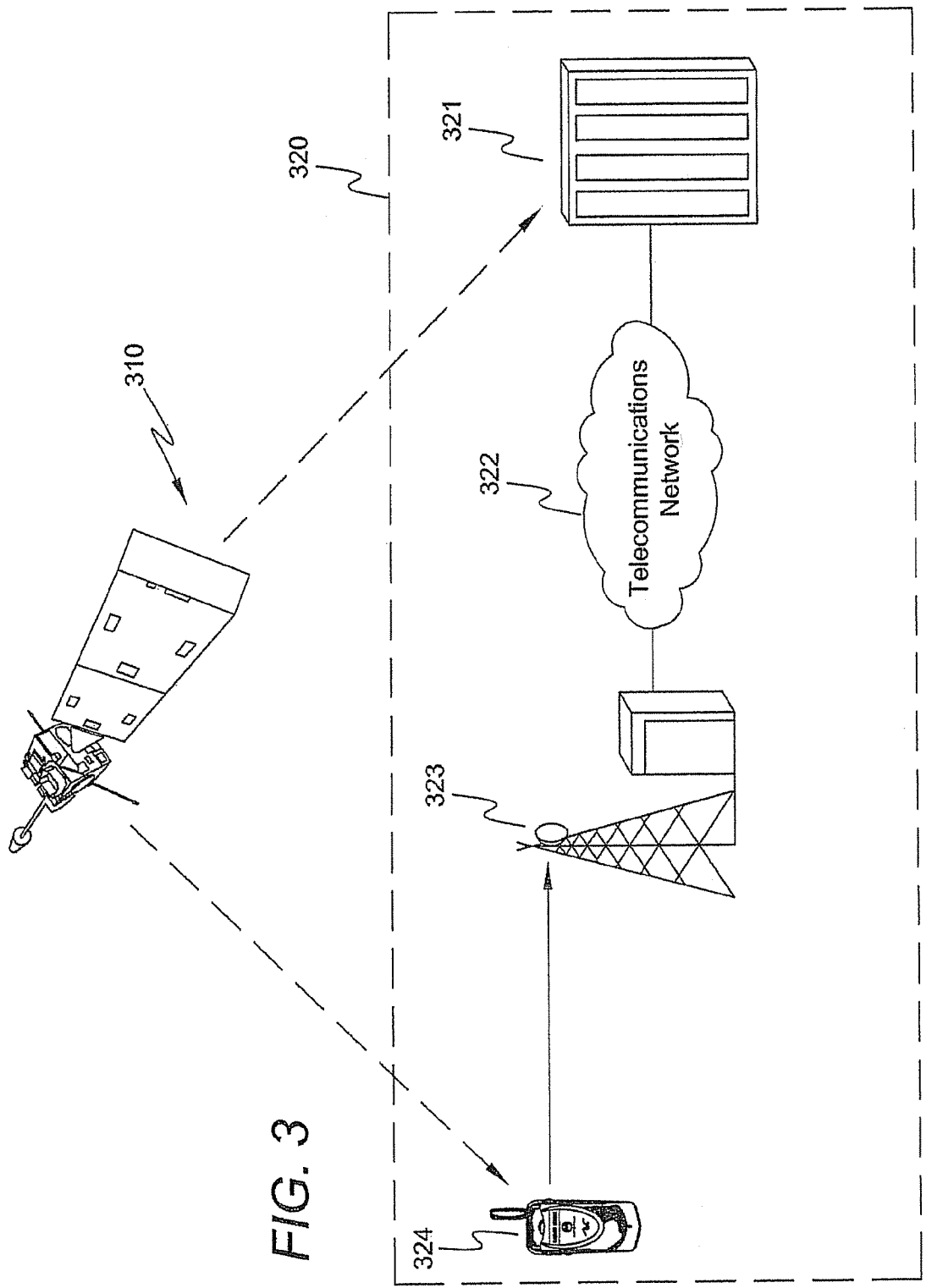
FIG. 3 is a schematic representation for implementing one embodiment of the present subject matter.

FIG. 3 is a schematic representation for implementing embodiments of the present subject matter. With reference to FIG. 3, a satellite system 310 may communicate with a terrestrial system 320. An exemplary satellite system 310 may be a GNSS such as, but not limited to, a GPS, Galileo system, GLONASS system, QZSS, Compass system, Bediou system, etc. The ground system 320 may include a cellular network having a location center 321 and may receive information from or include a SBAS, WAAS, EGNOS, digital television network, and combinations thereof. The location center 321 may be an MLC, LIS or other network component such as a central office configured to communicate with a telecommunications network 322 and/or at least one base station 323. The location center 321 may include a receiver for receiving signals transmitted from a mobile device 324, and circuitry for determining the location of the mobile device 324 as a function of received signals from the device 324. The receiver may receive a location request for a wireless device, the location request failing to identify an approximate location for the wireless device and having a position IE. In one embodiment of the present subject matter, the device 324 may communicate with the base station 323 to acquire GPS assistance data. For example, the location center 321 may or may not receive a preliminary estimate of the receiver's location or boundary thereof on the basis of the receiver's cell site or other area. The location center 321 may also determine a plurality of satellites as a function of this boundary or respective region and determine whether any one or more of these plural satellites are visible by the device 324. The location center 321 may also receive satellite information from GPS satellites. The satellite information may include the satellite's broadcast ephemeris information of the broadcasting satellite or that of all satellites or that of selected satellites. Further, the location center 321 may manipulate the assistance data to prevent the device 324 from searching and attempting to acquire signals from these one or more plural satellites. This information may then be transmitted or relayed to the mobile receiver and utilized for location determination. The location center 321 may relay the information back to the device 324 or use the information, either singularly or along with some preliminary estimation of the device's location, to assist the device in a geographic location determination. In another embodiment, any one or plural steps illustrated in FIG. 2 may be implemented at the location center 321 and communicated to the device 324. Of course, the estimated location of the device 324 may be determined as a function of additional signals provided by the network 322.

The location center 321 may also include one or more databases, some of which include information from exemplary reference networks. Exemplary reference networks may include a plurality of geographically dispersed reference stations and may include fixed reference stations, mobile reference stations, or combinations thereof. In a further embodiment, the location center 321 may include a transmitter for transmitting to the mobile device 324 acquisition assistance data, a location request, and other information and data. Exemplary devices 324 may be, but are not limited to, a cellular device, text messaging device, computer, portable computer, vehicle locating device, vehicle security device, communication device, or wireless transceiver. In one embodiment, the location center 321 may also include circuitry for mapping an IP address of a node serving the wireless device to an estimated area, and circuitry for determining a reference location for the wireless device, the reference location selected from any one or combination of: an area defined as a function of at least one of an MCC, MNC, and/or Area-ID, an area defined by a mapping of a provided IP address to a location, an area determined as a function of a position IE in a location request, and a default area.

FIG. 4 is an illustration of an exemplary algorithm according to an embodiment of the present subject matter. With reference to FIG. 4, a method 400 for determining a reference location of a wireless device is provided. At step 410, a location request for the wireless device may be received where the location request fails to identify an approximate location for the wireless device. At step 420, a position IE may also be received from the wireless device. This position IE may be in the location request. An IP address of a node serving the wireless device may then be mapped at step 430 to an estimated area. At step 440, if the estimated area defined by the mapped IP address is within a second area defined as a function of at least one of an MCC, MNC, and Area-ID, or if the estimated area defined by the mapped IP address is available and no second area is defined as a function of at least one of an MCC, MNC, and Area-ID, then a reference location may be determined for the wireless device as a function of a quality of the estimated area defined by the mapped IP address or a quality of the second area defined as a function of at least one of an MCC, MNC, and Area-ID. Of course, assistance data may then be provided to the wireless device as a function of the determined reference location and may be provided as a function of one or more boundaries of the determined reference location. In another embodiment, the determined reference location may be provided to the wireless device so that the device may determine its geographic location.

In yet a further embodiment, at step 450, a second reference location may be determined for the wireless device as a function of the position IE if the estimated area defined by the mapped IP address is not within the second area defined as a function of at least one of an MCC, MNC, and Area-ID or if the area defined by the mapped IP address is not available and no second area is defined as a function of at least one of an MCC, MNC, and Area-ID. Assistance data may then be provided to the wireless device as a function of the determined second reference location and may be provided as a function of one or more boundaries of the determined second reference location. In another embodiment, the determined second reference location may be provided to the wireless device so that the device may determine its geographic location.

FIG. 5 is an illustration of an exemplary algorithm according to a further embodiment of the present subject matter. With reference to FIG. 5, a method 500 for determining a reference location of a wireless device is provided. At step 510, a location request for the wireless device may be received where the location request fails to identify an approximate location for the wireless device. At step 520, a position IE may also be received from the wireless device. This position IE may be in the location request. An IP address of a node serving the wireless device may then be mapped at step 530 to an estimated area. At step 540, if the estimated area defined by the mapped IP address is within a second area defined as a function of at least one of an MCC, MNC, and Area-ID or if the estimated area defined by the mapped IP address is available and no second area is defined as a function of at least one of an MCC, MNC, and Area-ID, then a reference location may be determined for the wireless device as a function of the estimated area defined by the mapped IP address. Of course, assistance data may then be provided to the wireless device as a function of the determined reference location and may be provided as a function of one or more boundaries of the determined reference location. In another embodiment, the determined reference location may be provided to the wireless device so that the device may determine its geographic location.

In yet a further embodiment, at step 550, a second reference location may be determined for the wireless device as a default area or as the second area defined as a function of at least one of an MCC, MNC, and Area-ID if the estimated area defined by the mapped IP address is not within the second area defined as a function of at least one of an MCC, MNC, and Area-ID or if the estimated area defined by the mapped IP address is not available and no second area is defined as a function of at least one of an MCC, MNC, and Area-ID. Assistance data may then be provided to the wireless device as a function of the determined second reference location and may be provided as a function of one or more boundaries of the determined second reference location. In another embodiment, the determined second reference location may be provided to the wireless device so that the device may determine its geographic location.

As shown by the various configurations and embodiments illustrated in FIGS. 1-5, a method and system for determining a reference location for a mobile device have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

I claim:

1. A method for determining a reference location of a wireless device, comprising the steps of:
   (a) receiving a location request for the wireless device, the location request failing to identify an approximate location for the wireless device;
   (b) receiving a position information element ("IE") from the wireless device;
   (c) mapping an Internet protocol ("IP") address of a node serving the wireless device to an estimated area; and
   (d) if the estimated area defined by the mapped IP address is within a second area defined as a function of at least one of a mobile country code ("MCC"), mobile network code ("MNC"), and an Area-Identification ("Area-ID"), or if the estimated area defined by the mapped IP address is available and no second area is defined as a function of at least one of an MCC, MNC, and Area-ID, determining a reference location for the wireless device as a function of a quality of the estimated area defined by the mapped IP address or a quality of the second area defined as a function of at least one of an MCC, MNC, and Area-ID.

2. The method of claim 1 further comprising the step of providing assistance data to the wireless device as a function of the determined reference location.

3. The method of claim 2 wherein the assistance data is provided as a function of one or more boundaries of the determined reference location.

4. The method of claim 1 further comprising the steps of:
   (e) providing the determined reference location to the wireless device; and
   (f) determining a geographic location of the wireless device.

5. The method of claim 1 further comprising the step of:
   (e) determining a second reference location for the wireless device as a function of the position IE if the estimated area defined by the mapped IP address is not within the second area defined as a function of at least one of an MCC, MNC, and Area-ID or if the area defined by the mapped IP address is not available and no second area is defined as a function of at least one of an MCC, MNC, and Area-ID.

6. The method of claim 5 further comprising the step of providing assistance data to the wireless device as a function of the determined second reference location.

7. The method of claim 6 further comprising the steps of:
   (e) providing the determined second reference location to the wireless device; and
   (f) determining a geographic location of the wireless device.

8. The method of claim 1 wherein the determined reference location is a polygon.

9. The method of claim 1 wherein the Area-ID is selected from the group consisting of: location area code ("LAC") and Radio Network Controller-Identification ("RNC-ID").

10. A method for determining a reference location of a wireless device comprising the steps of:
    (a) receiving a location request for the wireless device, the location request failing to identify an approximate location for the wireless device;
    (b) receiving a position information element ("IE") from the wireless device;
    (c) mapping an Internet protocol ("IP") address of a node serving the wireless device to an estimated area; and
    (d) if the estimated area defined by the mapped IP address is within a second area defined as a function of at least one of a mobile country code ("MCC"), mobile network code ("MNC"), and an Area-Identification ("Area-ID") or if the estimated area defined by the mapped IP address is available and no second area is defined as a function of at least one of an MCC, MNC, and Area-ID, determining a reference location for the wireless device as a function of a quality of the estimated area defined by the mapped IP address.

11. The method of claim 10 further comprising the step of providing assistance data to the wireless device as a function of the determined reference location.

12. The method of claim 11 wherein the assistance data is provided as a function of one or more boundaries of the determined reference location.

13. The method of claim 10 further comprising the steps of:
    (e) providing the determined reference location to the wireless device; and (f) determining a geographic location of the wireless device.

14. The method of claim 10 further comprising the step of:
(e) determining a second reference location for the wireless device as a default area or as the second area defined as a function of at least one of an MCC, MNC, and Area-ID if the estimated area defined by the mapped IP address is not within the second area defined as a function of at least one of an MCC, MNC, and Area-ID or if the estimated area defined by the mapped IP address is not available and no second area is defined as a function of at least one of an MCC, MNC, and Area-ID.

15. The method of claim 14 further comprising the step of providing assistance data to the wireless device as a function of the determined second reference location.

16. The method of claim 15 further comprising the steps of:
(e) providing the determined second reference location to the wireless device; and
(f) determining a geographic location of the wireless device.

17. The method of claim 10 wherein the determined reference location is a polygon.

18. The method of claim 10 wherein the Area-ID is selected from the group consisting of: location area code ("LAC") and Radio Network Controller-Identification ("RNC-ID").

19. A system for determining a reference location of a wireless device comprising:
(a) a receiver for receiving a location request for a wireless device, the location request failing to identify an approximate location for the wireless device and having a position information element ("IE");
(b) circuitry for mapping an Internet protocol ("IP") address of a node serving the wireless device to an estimated area; and
(c) circuitry for determining a reference location for the wireless device as a function of a quality of an estimated area, the reference location selected from the group consisting of: an area defined as a function of at least one of a mobile country code ("MCC"), mobile network code ("MNC"), and an Area-Identification ("Area-ID"); an area defined by the mapped IP address; an area determined as a function of the received position IE; a default area; and combinations thereof.

20. The system of claim 19 further comprising a transmitter for transmitting assistance data to the wireless device as a function of the determined reference location.

21. The system of claim 19 wherein the Area-ID is selected from the group consisting of: location area code ("LAC") and Radio Network Controller-Identification ("RNC-ID").

* * * * *